Jan. 28, 1964
W. S. THOMPSON ETAL
3,119,457
WEIGHT CHECKING APPARATUS
Filed June 30, 1959
6 Sheets-Sheet 1
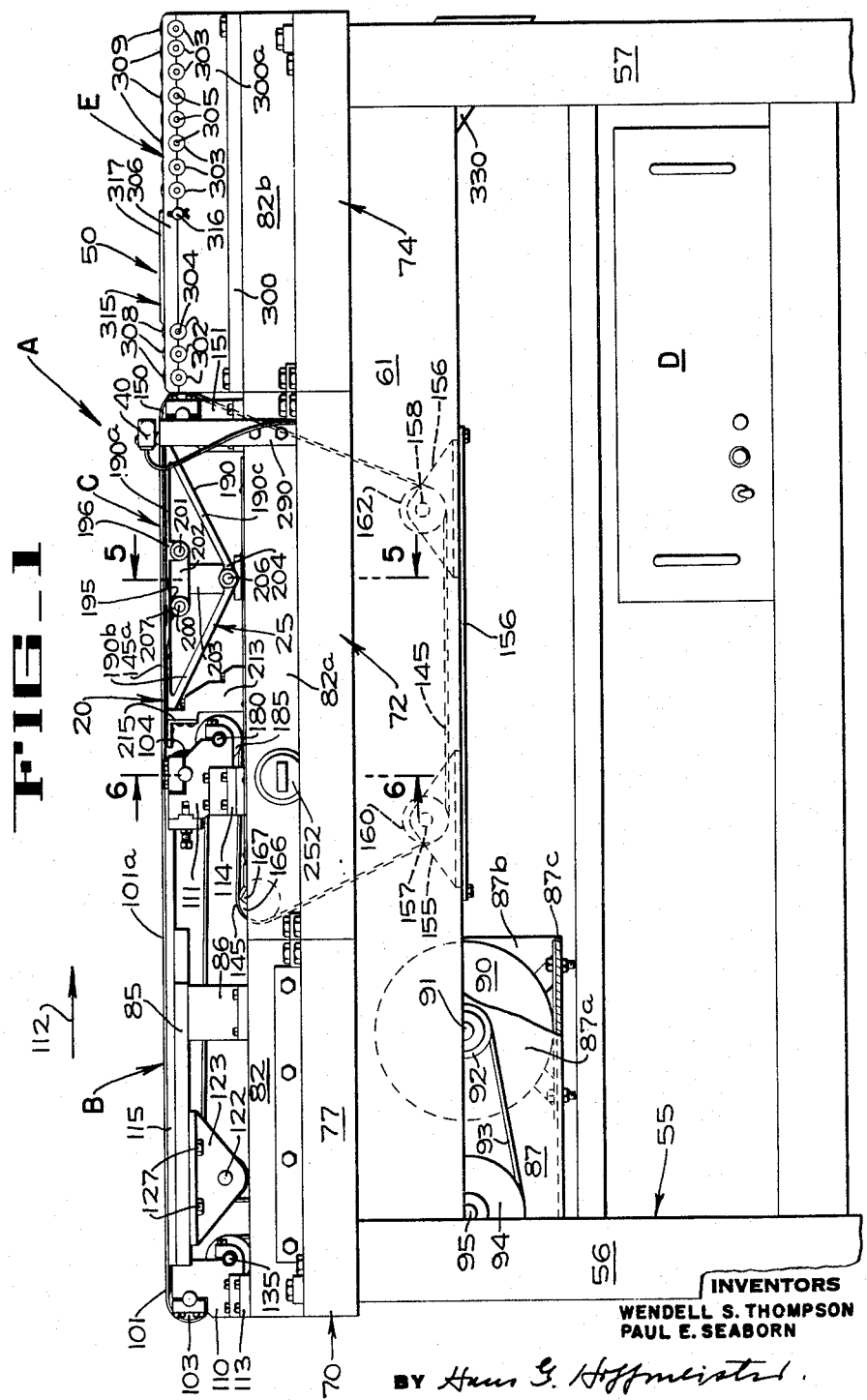
INVENTORS
WENDELL S. THOMPSON
PAUL E. SEABORN
BY Hans G. Hoffmeister
ATTORNEY

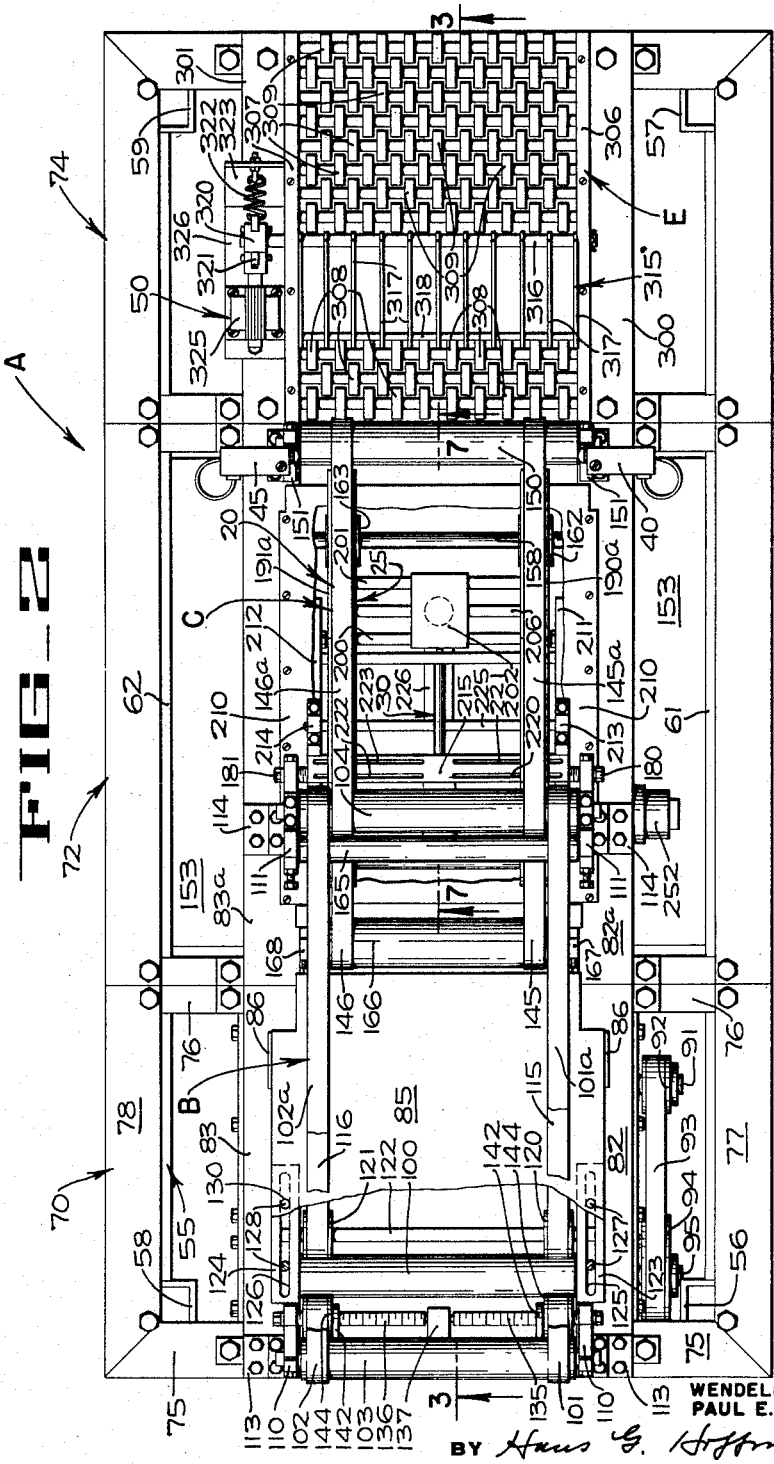

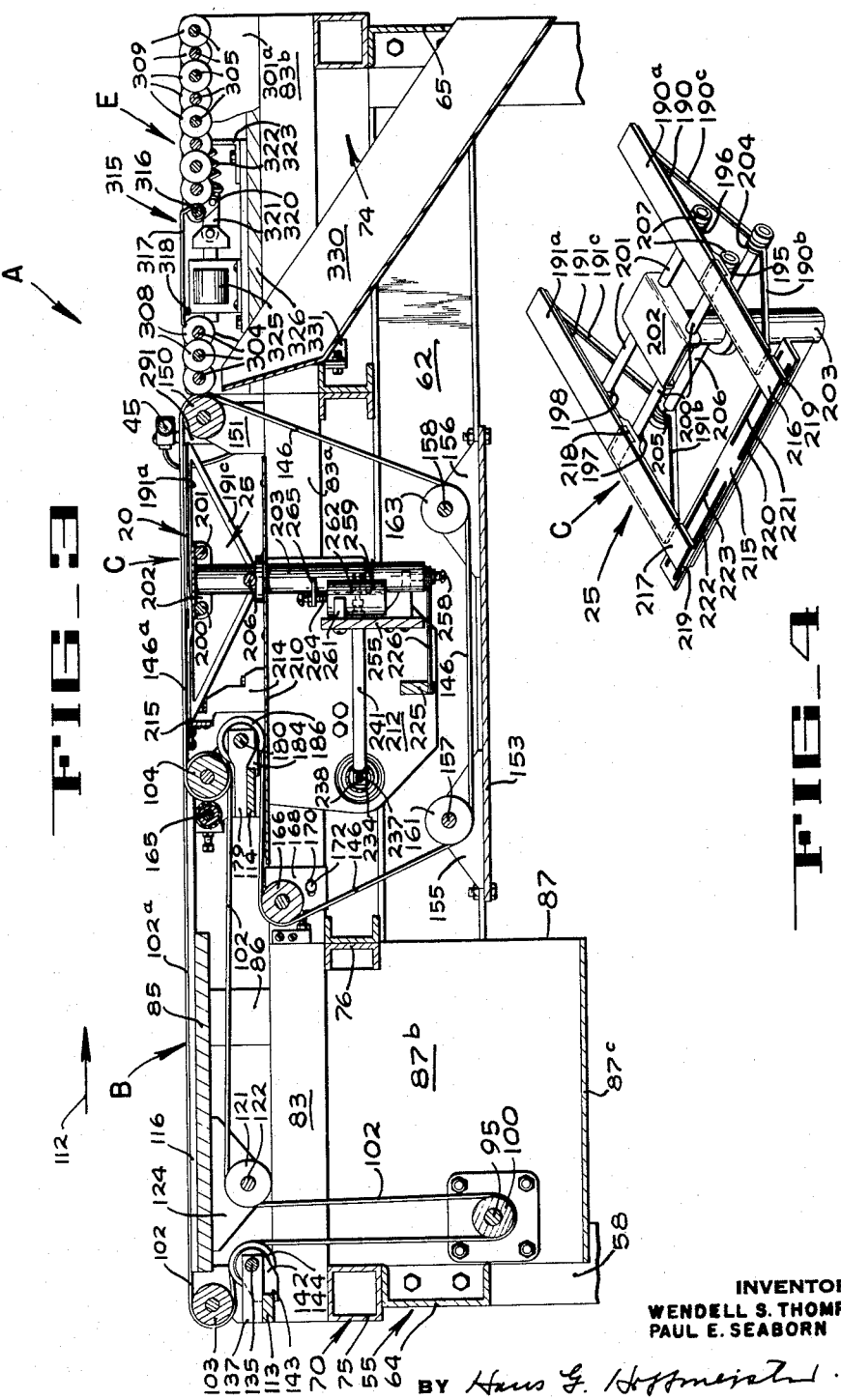

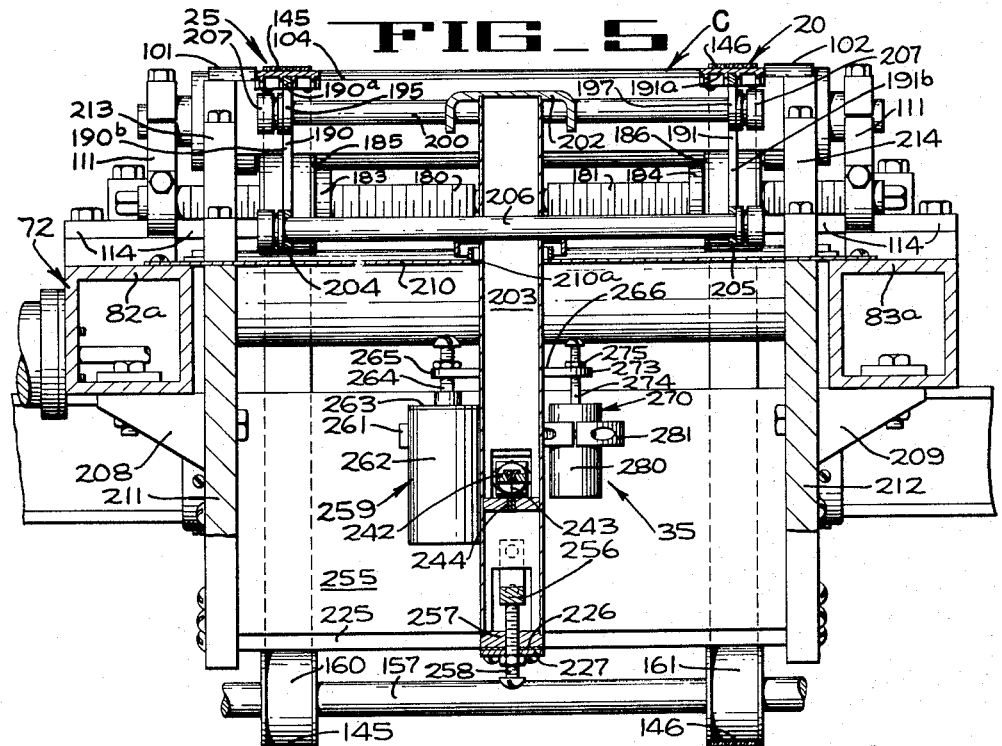
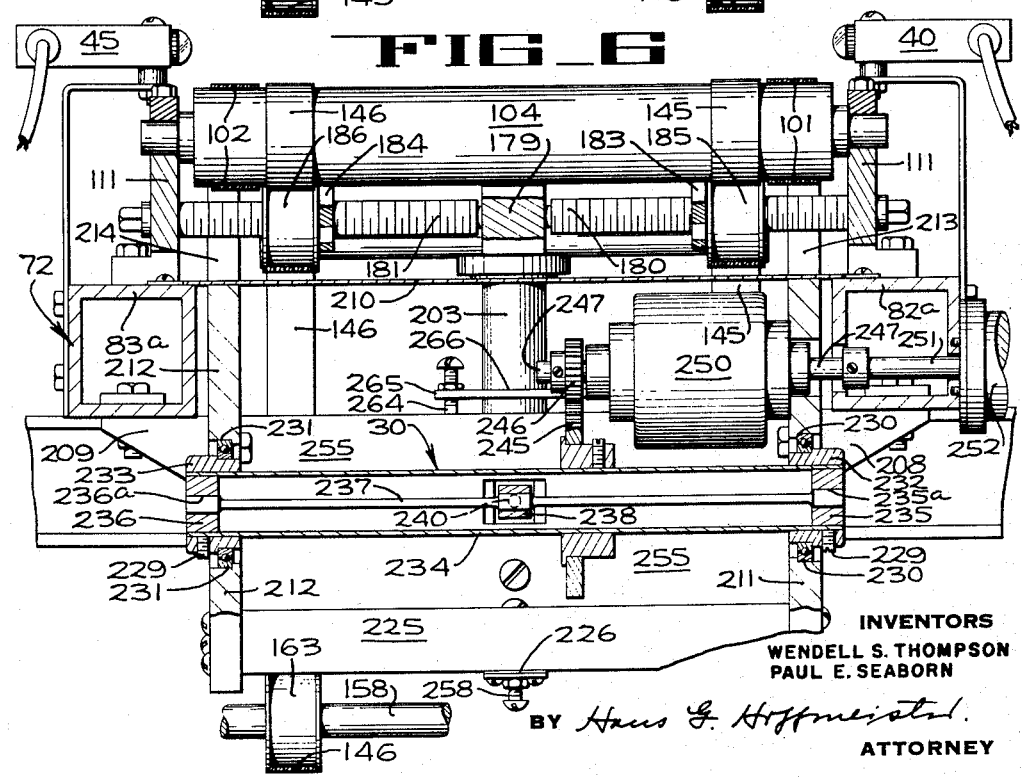

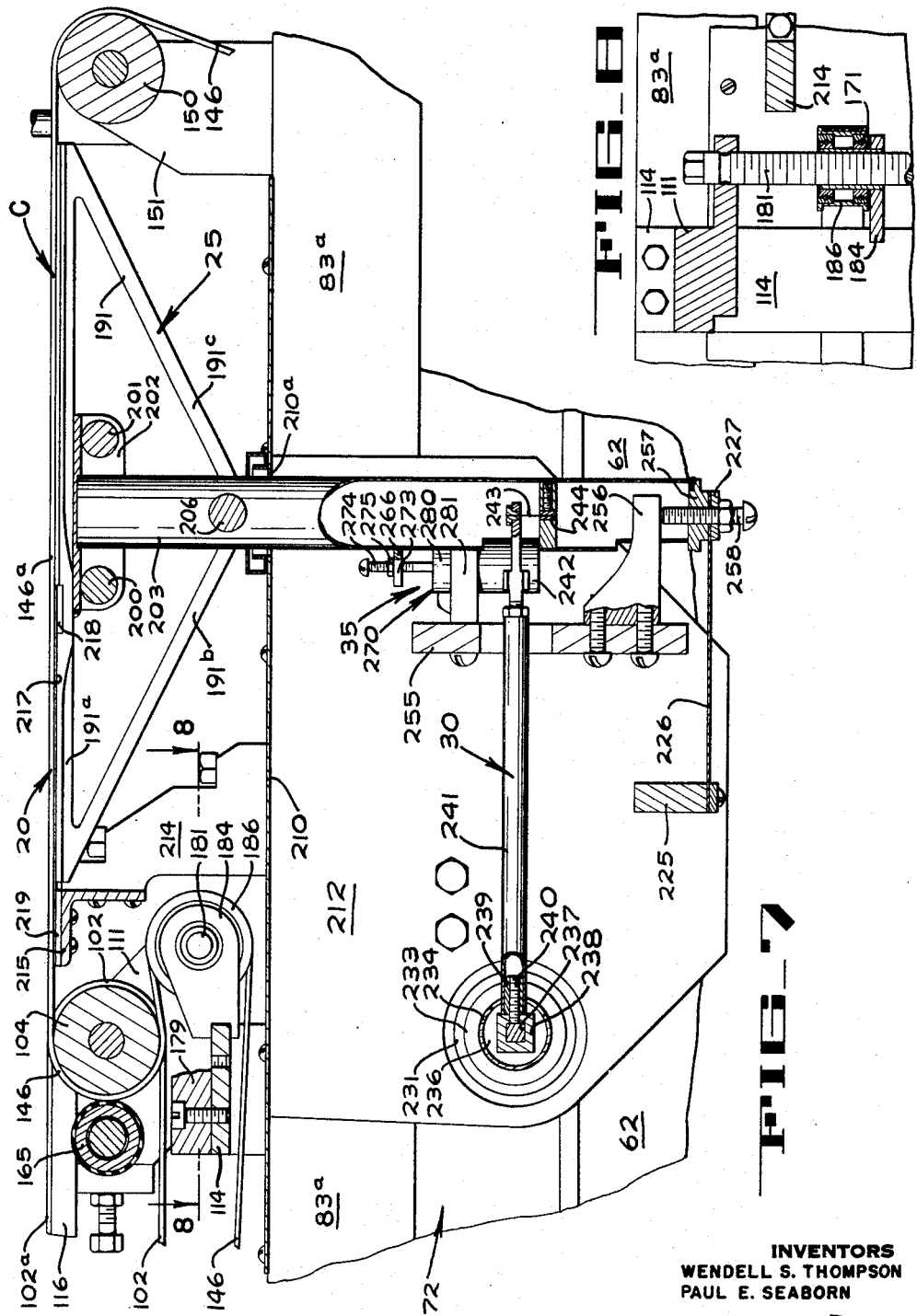

Jan. 28, 1964  W. S. THOMPSON ETAL  3,119,457
WEIGHT CHECKING APPARATUS
Filed June 30, 1959  6 Sheets-Sheet 6
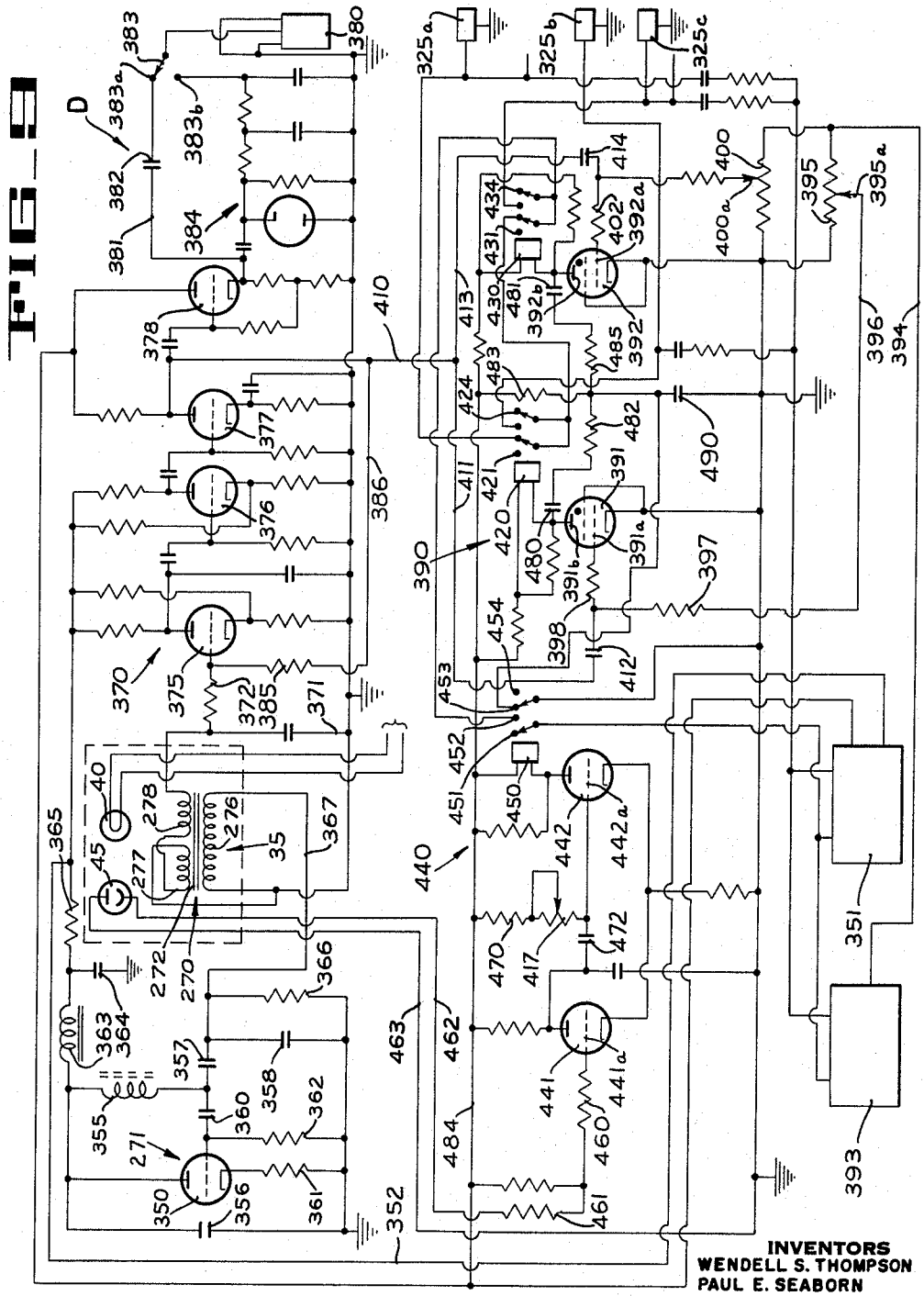
INVENTORS
WENDELL S. THOMPSON
PAUL E. SEABORN
BY Hans G. Hoffmeister.
ATTORNEY

United States Patent Office 3,119,457
Patented Jan. 28, 1964

3,119,457
WEIGHT CHECKING APPARATUS
Wendell S. Thompson, Los Gatos, and Paul E. Seaborn, Campbell, Calif., assignors to FMC Corporation, a corporation of Delaware
Filed June 30, 1959, Ser. No. 823,884
5 Claims. (Cl. 177—145)

The present invention appertains to weight checking apparatus and more particularly to an improved scale for weight checking apparatus.

An object of the present invention is to provide an improved weight checking apparatus.

Another object is to provide an improved high speed weight checking apparatus.

Another object of the present invention is to provide an apparatus for weighing and segregating a continuously advancing succession of articles, which apparatus is sensitive to relatively small differences of weight from a predetermined weight requirement.

Another object is to provide a scale having a depressible scale platform and improved means for accurately positioning the platform for receiving articles successively advanced thereacross.

Another object is to provide a preloading device for the scale of a weight checking apparatus.

Other objects and advantages of the present invention will become apparent from the following description and the drawings, in which:

FIG. 1 is a side elevation of the weight checking apparatus of the present invention.

FIG. 2 is a plan of the weight checking apparatus shown in FIG. 1.

FIG. 3 is a vertical section taken along line 3—3 of FIG. 2.

FIG. 4 is a perspective of a scale unit removed from the weight checking apparatus.

FIG. 5 is an enlarged vertical section taken along line 5—5 of FIG. 1.

FIG. 6 is an enlarged vertical section taken along line 6—6 of FIG. 1.

FIG. 7 is an enlarged vertical section taken along line 7—7 of FIG. 2.

FIG. 8 is an enlarged horizontal section taken along line 8—8 of FIG. 7.

FIG. 9 is a schematic diagram of the electronic circuits employed in the weight checking apparatus of the present invention.

The high speed weight checking apparatus A (FIGS. 1–3) of the present invention comprises a continuously operated feed conveyor B that receives, in succession, spaced apart articles such as packages filled with produce. Packages received by the feed conveyor B are transferred onto a continuously operated conveyor 20 of a weighing device C. The conveyor 20 advances the spaced apart packages in succession over a weighing platform 25 (FIG. 4) of the weighing device C to impose the weight of the packages individually upon the platform 25. Successive packages are spaced apart a sufficient distance so that only one package at a time advances across the plaform 25.

The platform 25 is supported for movement in a vertical direction and is depressible under the weight of a package imposed thereon. A torsion bar assembly 30 (FIGS. 2, 6 and 7) preloads the platform 25 to a predetermined value whereby a package of a weight in excess of the preload value deflects the platform 25 by an amount representative of the overweight of the package advancing thereacross. Since the conveyor 20 is continuously driven, the platform 25 is of sufficient length so that each package is supported individually thereon for a period of time enabling the platform 25 to react fully to the weight of a package. In addition, the space between successively advancing packages is adequate to permit the platform 25 to return to its no load position.

Associated with the weighing device C is an electromechanical transducer 35 (FIGS. 5 and 7) that translates the deflection of the platform 25, under the weight of a package, into a voltage signal. The signal produced by the transducer 35 is representative of the difference between the weight of the package and the preload value. Adjacent the discharge end of the scale platform 25 is mounted a suitable source of light, such as a lamp 40 (FIG. 2), which projects a beam of light transversely to the path of travel of the packages. In the path of the projected light is a phototube 45 that is operative to send out a control signal each time the light beam is interrupted by a package advancing beyond the discharge end of the platform 25.

An electronic control unit D, disposed at the lower right hand end of the machine (FIG. 1), receives the signals transmitted by the transducer 35 and the phototube 45, and controls the operation of a reject mechanism 50 of a discharge conveyor E. It will thus be seen that weighed packages are continuously delivered in succession by the conveyor 20 of the weighing device C to the discharge conveyor E. Packages meeting a prescribed weight requirement are transferred by the discharge conveyor E to a loading platform, not shown, while packages failing to meet the prescribed weight requirement are segregated by the reject mechanism 50 of the discharge conveyor E for transfer onto a reject platform, not shown.

As shown in FIGS. 1 and 2, the weight checking apparatus A includes a support table 55 having four corner posts 56–59, two longitudinal side channels 61 and 62, and two transverse channels 64 and 65 (FIG. 3), all secured together, as by welding or bolting, to form a rigid support structure. The feed conveyor B, the scale C, and the reject unit E are mounted on separate frame structures 70, 72 and 74 (FIGS. 1 and 3), respectively, each of which is bolted to the longitudinal channel members 61 and 62 of the table. The frame 70 is a welded structure comprising a transverse tubular member 75, a transverse channel 76, and two longitudinal tubular members 77 and 78 (FIG. 2). The frames 72 and 74 are similar welded structural members. Since each frame is an independent unit, it will be seen that each sub assembly may be quickly and easily removed for servicing or replacement.

Two longitudinally extending, transversely spaced support members or beams 82 and 83 are mounted on the upper surface of the frame 70, the member 82 being in alignment with similar support members 82a and 82b on the frames 72 and 74 respectively, and the member 83 being in alignment with support members 83a and 83b of the frames 72 and 74. A horizontal plate 85 (FIGS. 2 and 3) is mounted in spaced relation above the frame 70 by brackets 86 that are secured to and project upwardly from the frame 70. A U-shaped bracket 87 (FIG. 1) has side walls 87a and 87b welded to the longitudinal members 82 and 83 respectively of the frame 70 and has a base 87c on which a drive motor 90 of the feed conveyor B is mounted. Fixed to the drive shaft 91 of motor 90 is a drive pulley 92. A drive belt 93 is trained around the pulley 92 and around a pulley 94 which is fixed to a shaft 95 for rotating the same. The shaft 95 is supported for rotation by the side walls of the U-shaped plate 87. Mounted on the shaft 95 for rotation therewith is a transverse drive roller 100 (FIGS. 2 and 3) which is keyed to the shaft 95 by suitable means (not shown).

The feed conveyor B comprises a pair of transversely spaced, relatively narrow endless belts 101 and 102, each of which is trained around the drive roller 100, and around two similar elongated transverse rollers 103 and 104. Suitable upstanding brackets 110 and 111 (FIG.

2) are mounted on longitudinally spaced transverse bars 113 and 114, respectively and support the rollers 103 and 104 for rotation. The transverse bar 113 is secured to the longitudinal beams 82 and 83, and bar 114 is secured to beams 82a and 83a. The horizontal runs 101a and 102a of belts 101 and 102 support spaced apart packages and advance the packages in the direction shown by the arrow 112 (FIG. 1). Mounted on the fixed support plate 85 below the runs 101a and 102a, respectively, are longitudinally extending runners 115 and 116 (FIGS. 1 and 3) that can be adjusted to vary the transverse distance therebetween. Suitable guide rails, not shown, are mounted on the support plate 85 outwardly of the runners 115 and 116, respectively.

For controlling the tension on the belts 101 and 102, flanged take-up rollers 120 and 121 (FIGS. 2 and 3) have the belts 101 and 102, respectively, trained therearound. The flanged rollers 120 and 121 are mounted for sliding and rotary movement on a shaft 122 that is supported by depending side plates 123 and 124. The side plates 123 and 124 have slotted, horizontally extending flanges which are adjustably supported by the horizontal plate 85 (FIG. 2) for longitudinal movement. For this purpose, suitable longitudinally disposed slots 125 and 126 are formed in the upper surfaces of the plates 123 and 124 to receive bolts 127 and 128, which are also received by suitable tapped openings 129 and 130 of the plate 85.

The transverse distance between the runs 101a and 102a of the endless belts 101 and 102, respectively, may be varied to accommodate different size packages. Toward this end, threaded shafts 135 and 136 (FIG. 2) are supported for rotation by the two spaced brackets 110 and by a central block 137 which is secured to the transverse bar 113. In threaded engagement with the shafts 135 and 136, respectively, are two spaced sleeves 142 (FIG. 2). As seen in FIG. 3, each sleeve 142 has a bifurcated projection 143 disposed in sliding engagement with the fixed transverse bar 113. Each sleeve 142 carries a rotatable flanged roller 144 around which one of the endless belts 101 or 102 is trained. By rotating the threaded shafts 135 and 136, when the feed conveyor B is operating, the sleeves 142 and the flanged rollers carried thereon can be adjusted toward or away from each other to vary the transverse distance between the endless conveyor belts 101 and 102.

Spaced packages are advanced on the horizontal runs 101a and 102a of the feed conveyor B for discharge onto the conveyor 20 of the weighing device C. The conveyor 20 comprises transversely spaced, relatively narrow endless belts 145 and 146 (FIGS. 2 and 3) that are trained around the roller 104 of the feed conveyor B to be continuously driven thereby. As shown in FIGS. 2 and 3, the roller 104 is mounted adjacent the feed end of the weighing platform 25 of the weighing device C. Adjacent the discharge end of the platform 25 is disposed a transverse roller 150 which is supported for rotation by brackets 151. The brackets 151 are mounted on the longitudinal beams 82a and 83a. The transverse roller 150, in conjunction with the roller 104, supports horizontal runs 145a and 146a of the conveyor belts 145 and 146, respectively, which horizontal runs are disposed inwardly of the horizontal runs 101a and 102a of conveyor B and are disposed at the same elevation as the runs 101a and 102a to effect a smooth transfer of spaced packages from the feed conveyor B to the weighing device C.

A horizontal plate 153 (FIG. 3) is connected between the side channels 61 and 62 of the table 55 and, mounted on the plate 153 are two longitudinally spaced, upstanding brackets 155 and 156 (FIGS. 1 and 3) that support shafts 157 and 158, respectively, for rotation. Freely mounted on the shaft 157 are transversely spaced, flanged idler rollers 160 and 161 (FIG. 5) and freely mounted on the shaft 158 are transversely spaced, flanged idler rollers 162 and 163 (FIG. 2). The endless conveyor belt 145 is trained around the rollers 160 and 162, while the endless conveyor belt 146 is trained around the rollers 161 and 163. A pressure roller 165 (FIG. 3) is supported by the brackets 111 and is disposed adjacent the roller 104 to engage the runs of the belts 145 and 146 that are trained around the roller 104.

For controlling the tension on the belts 145 and 146, the belts are trained around a transverse take-up roller 166 (FIGS. 2 and 3) which is supported for rotation by brackets 167 and 168 (FIG. 2) that are in turn supported by the longitudinal beams 82a and 83a, respectively. Suitable longitudinally extendings slots 170 (only one shown in FIG. 3) are formed in the beams 82a and 83a, respectively, which receive screws 172 for adjustably positioning the brackets 167 and 168 longitudinally of the machine.

The transverse distance between the runs 145a and 146a of the endless belts 145 and 146, respectively, may be varied to accommodate different size packages. Toward this end, threaded shafts 180 and 181 (FIG. 5) are supported for rotation by the brackets 111 and by a central block 179 which is rigid with the transverse bar 114. In threaded engagement with the shafts 180 and 181, respectively, are sleeves 183 and 184 (FIGS. 5-7) that have bifurcated projections which slidably engage the transverse bar 114 for movement in the transverse direction. Mounted on the sleeves 183 and 184 are bearings (such as bearing 171 of FIG. 8) for supporting flanged rollers 185 and 186, respectively for rotation relative to the sleeves. Trained around the flanged rollers 185 and 186 are the endless belts 145 and 146, respectively. By rotating the threaded shafts 180 and 181, when the conveyor 20 is operating, the transverse distance between the rollers 185 and 186 can be adjusted to vary the transverse distance between conveyor belts 145 and 146.

The horizontal runs 145a and 146a of the conveyor 20 receive spaced packages from the feed conveyor B and advance the packages continuously in succession across the platform 25 to impose the weight of the packages individually upon the platform 25. The distance between successive packages is arranged so that only one package at a time advances across the platform 25. The platform 25 comprises upright, triangular side members 190 and 191 (FIG. 4) with horizontal legs 190a and 191a forming transversely spaced runners or races for the horizontal runs 145a and 146a, respectively (FIG. 4), of the endless belts 145 and 146. The remaining legs 190b and 190c of the side member 190 form a junction below the midpoint between the ends of the leg 190a. In a similar manner, the remaining legs 191b and 191c of the side member 191 form a junction below the midpoint between the ends of the leg 191a. Depending from the runner 190a are longitudinally spaced ears 195 and 196. In transverse alignment with the ears 195 and 196 are longitudinal, spaced ears 197 and 198 that depend from the runner 191a. Interconnecting the ears of the runners 190a and 191a are transversely disposed rods 200 and 201. Centrally located relative to the transverse distance between the runners 190a and 191a, as well as to the ends of the runners 190a and 191a, is an inverted U-shaped plate 202 which has suitable openings in the side walls thereof to receive the rods 200 and 201. The upper surface of the plate 202 is lower in elevation than the upper surfaces of the runners 190a and 191a. Rigid with the undersurface of the horizontal portion of the plate 202 is a depending tubular column or post 203 (FIG. 3). The tubular column 203 is located so that its axis is centrally positioned relative to the transverse distance between the runners 190a and 191a, as well as to the ends of the runners 190a and 191a. At the junction of the legs 190b and 190c of the side member 190 is a hub 204 (FIG. 4) and at the junction of the legs 191b and 191c of the side member 191 is a hub 205 (FIG. 4). Interconnecting the hubs 204 and 205 is a rod 206 that is received by a suitable opening in the tubular column 203. The transverse distance between the runners 190a and 191a may be varied to accommodate different size packages by sliding the side members 190 and 191 on the rods 200, 201 and 206 in the transverse direction toward or away from one another. Suitable clamp collars 207 (FIG. 5) may be mounted on the rods 200 and 201 to retain the side members 190 and 191 in adjusted positions.

To protect the operating mechanism mounted below the weighing platform 25, a horizontal mounting plate 210 (FIGS. 5 and 7) is fixed to the upper surfaces of the beams 82a and 83a. A suitable opening 210a is provided in the plate 210 to permit free vertical movement of the tubular column 203.

The platform 25 is supported by two longitudinally extending side mounting plates 211 and 212 (FIGS. 3 and 5) which are secured by suitable brackets 208 and 209 (FIGS. 5 and 6) to the beams 82a and 83a, respectively. Secured to the upper surfaces of the side plates 211 and 212 are transversely spaced, upstanding brackets 213 (FIG. 1) and 214 (FIG. 7) that mount a transverse angle bar 215 (FIGS. 4 and 7). Anchored to the angle bar 215 are transversely spaced upper leaf springs 216 and 217 (FIG. 4) that extend in the direction of travel of the packages advanced by the conveyor 20. At its other end, each of the parallel leaf springs 216 and 217 is secured by means of a mounting block 218 and by screws to the runners 190a and 191a, respectively. The blocks are fixed to the leaf springs by suitable means such as epoxy resin. When the transverse space between the runners 190a and 191a is varied, the anchored ends of the leaf spring 216 and 217 are similarly shifted. Toward this end, transverse slots 220—223 are provided in the angle bar 215 to receive suitable screws that anchor the leaf springs 216 and 217 to the angle bar 215 by means of blocks, such as block 219 of FIG. 7. The blocks are secured to the leaf springs by suitable means, such as epoxy resin. Secured between lower portions of the side plates 211 and 212 is a transverse bar 225 (FIGS. 5–7) having a leaf spring 226 anchored thereto. The lower leaf spring 226 is horizontally disposed and extends longitudinally in the general direction of travel of the packages advanced by the conveyor 20 in parallel relation with the leaf springs 216 and 217. At the outer end thereof, the leaf spring 226 is secured by means of a block 227 (FIG. 7) and by screws to the lower end of the tubular column 203.

From the foregoing, it is to be observed that the weighing platform 25 is supported by leaf springs 216, 217 and 226 for movement in a vertical direction. The horizontal force produced by a package advancing across the weighing platform 25 does not influence the depression of the weighing platform and the depression of the weighing platform 25 is not a function of the position of the package advancing thereacross. The runners 190a and 191a are of sufficient length to permit the weighing device C to react fully to the weight of the individual package advancing continuously across the platform 25 and the space between successive packages is adequate to permit the platform 25 to return to its no load position. The contact area between the conveyor belts 145 and 146 and the packages is minimized, and also the contact area between the platform 25 and conveyor belts 145 and 146 is reduced to improve the accuracy of the weighing device C.

The weighing device C is preloaded by the torsion bar assembly 30 (FIGS. 5–7), so that the scale platform 25 is depressed when a package advancing thereacross is of a weight in excess of a predetermined preload value. The torsion bar assembly 30 is supported by the side plates 211 and 212 (FIG. 6) which having suitable openings for mounting bearings 230 and 231, respectively. Journalled for rotation by the bearings 230 and 231 are end caps 232 and 233, respectively, of a tubular housing 234.

At opposite ends of the tubular housing 234 are end plugs 235 and 236, which are fixed to the tubular housing 234 by set screws 229. Mounted within the tubular housing by means of the end plugs 235 and 236 is a torsion bar 237. The end portions of the torsion bar 237 are square in cross sectional area and are received by square central openings 235a and 236a in the plugs 235 and 236. Midway between its ends, the torsion bar 237 has a drive portion of square cross section which receives a hub 238 (FIG. 7) in driving engagement. A tapped sleeves 239 is secured, as by soldering to the hub, and a setscrew 240 is threaded through the sleeve to bear against the torsion bar 237 to prevent movement of the hub on the bar. The sleeve 239 is secured by resin in the end of a beam-loading tube 241 which has an arm 242 fitted thereto, which is received by a suitable opening in the tubular column 203. A suspension linkage 243 (FIGS. 5 and 7) in the form of piano wire is supported by the arm 242. At its lower end the wire is secured to a spool 244 that is secured by a setscrew in a plate extending transversely in the inner tubular wall of the column 203.

For applying a turning force to the end portions of the torsion bar 237, the tubular housing 234 is fixed by a set screw to the hub of a gear 245 (FIG. 6) that meshes with a gear 246. The gear 246 is fixed to a shaft 247 of a conventional gear type speed reduction unit 250. Coupled to the shaft 247 is a rod 251 that passes through the side walls of the beam 82a and has secured thereto an adjusting knob 252 (FIG. 1). The gear reduction unit 250 is supported by the side mounting plate 211.

Thus, the rotation of the adjusting knob 252 imparts a turning movement to the tubular housing 234 through the gear reduction unit 250 and the gears 246 and 245. The tubular housing 234, in turn, applies a turning force to the end portions of the torsion bar 237 by means of the plugs 235 and 236. The direction of rotation of the tubular housing 234 is such that the torsion bar 237 transmits a force to the sleeve 239 through the hub 238 to cause the tube 241, the arm 242 and the suspension linkage 243 to urge the tubular column 203 upwardly.

Bolted to the side plates 211 and 212 is an upright, transversely extending mounting plate 255 (FIG. 7) that has a suitable opening for receiving the tube 241 of the torsion bar assembly 30. Rigid with the lower portion of the mounting plate 255 is a stop plate 256 that projects through a suitable opening in the tubular column 203. At the lowermost end of the tubular column 203 is fitted a plug 257 having an internally threaded base for receiving a stop screw 258. The plug 257 is secured to the column 203 by means of screws. The stop screw 258 projects into the tubular column 203 to engage the lower surface of the stop plate 256 and can be adjusted to vary the height thereof.

To accurately adjust the preloading of the weighing device C under no-load condition, the stop screw 258 is adjusted until the upper end thereof engages the stop plate 256. Thereupon, the knob 252 is rotated to impart a turning movement to the tubular housing 234 in a manner previously described. The housing 234, in turn, imparts a rotating force to the ends of the torsion bar 237. The center of the torsion bar 237 is connected to the tubular column 203 by means of the hub 238, tube 241, arm 242, the suspension linkage 243 and spool 244 to urge the tubular column 203 upwardly. However, the tubular column 203 is limited in its upward movement, since the stop plate 256 is in abutting engagement with the stop screw 258. This action enables the rotation of the knob 252 to set a desired preload in the torsion bar 237. Accordingly, the scale platform will not be moved downwardly under a load that is less than the preload value.

For damping oscillations and vibrations of the weighing device C, a damping assembly 259 (FIG. 5) is secured by a suitable bracket 261 to the stationary vertical mounting plate 255. The damping assembly 259 includes a vessel 262 containing a suitable viscous fluid. A cap 263 is secured in threaded engagement to the vessel 262 and has a centrally disposed aperture through which a threaded rod 264 is freely movable. The lower end of the rod 264 has secured thereto a suitable paddle, not shown, while the upper end of the threaded rod 264 is carried by an arm 265 of a horizontal support bracket 266. The bracket 266 is fixed to the tubular column 203 for movement therewith. Thus, the rod 264 moves in a vertical direction with the movement of the scale platform 25. Since the movement of the paddle on the rod 264 is resisted by the fluid within the vessel 262, any tendency for weighing device C to vibrate is effectively minimized by the damping assembly 259.

The electromechanical transducer 35 (FIG. 5), which translates the movement of the weighing platform 25 into voltage signals, comprises a detector transformer 270 and a suitable source of excitation current, such as an oscillator 271 (FIG. 9). The detector transformer 270 includes a movable core 272, which is attached to a threaded rod 274 (FIG. 5) carried by an arm 273 of the mounting bracket 266. A lock nut 275 retains the threaded core in adjusted position on the bracket 266. Thus, the movable core 272 (FIG. 9) moves in a vertical direction with the movement of the weighing platform 25. In addition, the detector transformer 270 comprises a primary winding 276 and two secondary windings 277 and 278. The primary winding 276 and the secondary windings 277 and 278 are mounted in fixed position within a suitable cylindrical housing 280 (FIG. 7) that is secured to the stationary vertical plate 255 by means of a bracket 281. It is to be observed that the core 272 moves with the deflection of the scale platform 25 and is disposed centrally of the transformer windings for vertical movement relative thereto.

As hereinbefore indicated, the detector transformer 270 with the oscillator 271 is an electromechanical transducer that translates the linear deflection of the weighing platform 25 into a voltage signal. For this purpose, the primary winding 276 (FIG. 9) is energized by the oscillator 271, which is a source of excitation voltage. When the primary winding 276 is energized by the oscillator 271, voltages are induced in the secondary windings 277 and 278, respectively. The secondary windings 277 and 278 are connected in series opposition. Consequently, the two voltages induced in the secondary windings 277 and 278 are opposite in phase and the net voltage across the output of the secondary windings 277 and 278 is the difference of the two voltages. In the electrical center position of the core 272, the net output is zero. This is called the balance point or null position. As the core 272 is moved from the null position, the voltage induced in the secondary winding toward which the core 272 is moved increases, while the voltage induced in the other secondary winding decreases. This produces a differential voltage across the output of the secondary windings 277 and 278, which varies linearly with the change in core position. Movement of the core 272 in an opposite direction beyond the null position produces a similar linear voltage characteristic, but with the phase of the output voltage shifted 180°.

When the weighing platform 25 is in the underpressed position, which is the no load condition, the core 272 is disposed relative to the windings 277 and 278 so that a desired output voltage is produced across the secondary windings 277 and 278. This is accomplished by rotating the threaded rod 274 of the core 272 to adjust the position of the core 272 relative to the windings of the detection transformer 270. When a package advancing across the weighing platform 25 is of a weight equal to or less than the preload value, the resultant movement of the weighing platform 25, if any, is insufficient to displace the core 272 in a manner to materially alter the output voltage of the detector transformer 270. However, the platform 25, when receiving thereon a package of a weight in excess of the preload value, moves the core 272 sufficiently to effect a material voltage change in the output of the transformer 270. It is to be observed, however, that the detector transformer 270 detects the magnitude of linear descent of the weighing platform 25 and produces a signal indicative of such magnitude. This, of course, is a function of the amount by which the weight of a package advancing across the platform 25 exceeds the predetermined preload value.

Adjacent the discharge end of the platform 25 is mounted the lamp 40 (FIGS. 2 and 9), which is connected to a suitable source of electrical power, not shown. The lamp 40 is supported by a bracket 290 (FIG. 1) that is rigid with the beam 82a and continuously projects a beam of light transversely to the direction of travel of the packages and in the path of packages leaving the platform 25. The phototube 45 (FIGS. 2 and 9) is mounted on a bracket 291 (FIG. 3) that is rigid with the beam 83a and is disposed in the path of the beam of light projected by the lamp 40. Each time a package advances beyond the discharge end of the platform 25, the beam of light projected toward the phototube 45 is interrupted and the phototube 45 is operative to effect a control signal.

Packages advanced by the conveyor 20 of the weighing device C are delivered in succession to the discharge mechanism E (FIGS. 1–3). The discharge mechanism E comprises a pair of angle side members 300 and 301, which are bolted to the beams 82b and 83b, respectively. In the upper surfaces of the vertical arms 300a and 301a of the angle side members 300 and 301 are formed series of upwardly-opening semi-cylindrical, spaced openings 302 and 303. Seated within the openings 302 and 303 are series of bearings for supporting series of transverse shafts 304 and 305, respectively, for rotation. Screwed to the upper surfaces of the side members 300 and 301 are caps in the form of straps 306 and 307, respectively, that have semi-circular openings complementary to the openings 302 and 303 for retaining the shaft supporting bearings in their seated positions. Mounted on the shafts 304 and 305 for rotation therewith are rollers 308 and 309, respectively, which are spaced apart on the shafts by spacer members interposed between adjacent rollers.

Between the series of shafts 304 and the series of shafts 305 is located a reject door or gate 315 of the reject assembly 50. The reject door 315 includes a shaft 316 that is supported for rotation in the manner previously described in connection with the shafts 304 and 305. Welded to the shaft 316 for movement therewith is a plurality of transversely-spaced, longitudinally-extending rigid ribs 317 that are interconnected by a transverse rod 318. The ribs 317 extend from the shaft 316 to the closest shaft 304, thereby occupying the space between the series of rollers 308 and the series of rollers 309. Keyed to the shaft 316 for imparting pivotal movement thereto is a lever arm 320 that is pivotally connected intermediate the ends of a link 321. The link 321 is pivotally connected at one end to the plunger of a solenoid 325 and, at the other end, the link 321 is connected to a spring 322. The spring 322 is anchored to a bracket 323 that is bolted to a support plate 326, which is rigid with the side plate 301 and supports the solenoid 325.

Packages are transferred in succession from the conveyor 20 of weighing device C to the discharge mechanism E. If the solenoid 325 is deenergized, the packages discharged onto the discharge mechanism E will advance under their own momentum across the rollers 308, the reject door 315, and the rollers 309 to a loading platform, not shown. When the solenoid 325 is energized, the link 321 pivots the arm 320 which, in turn, pivots the reject door 315 in a clockwise direction (as viewed in FIG. 3) about the axis of the shaft 316. The solenoid 325 is energized in a manner to be described hereinbelow when the package discharged by the conveyor 20 fails to meet a prescribed weight requirement. When a package failing to meet the prescribed weight requirement is discharged from the conveyor 20, the package advances across the rollers 308 under its own momentum and drops through the open reject door onto a chute 330 (FIG. 3) for transfer onto a reject platform, not shown. The chute 330 is supported by suitable brackets 331, which are mounted on the frame unit 74 so that its receiving end is below the reject door 315. The solenoid 325 is deenergized before the succeeding package is discharged by the conveyor 20, and the shaft 316 is returned to its initial position under the action of the spring 322 so that the reject door is again occupying the space between the rollers 308 and the rollers 309.

The energization of the solenoid 325 is controlled by the electronic control unit D (FIG. 9), which is operatively responsive to the signals transmitted by the detector transformer 270 and the phototube 45. As previously described, the signal transmitted by the detector transformer 270 is of a magnitude representative of the difference between the weight of a package advancing across the platform 25 and the preload force transmitted by the torsion bar assembly 30. The control signal emitted by the phototube 45 indicates that a weighed package has its leading edge advancing beyond the weighing platform 25.

The oscillator 271, which excites the primary winding 276 of the detector transformer 270, produces a constant 2 kc. signal and is of the type referred to as a Colpitts oscillator. Included in the oscillator 271 is a triode tube 350 that receives its plate voltage from a suitable positive power supply 351 over a conductor 352. The tank circuit for the oscillator 271 comprises inductance coil 355 and capacitors 356, 357 and 358. To obtain a desired output voltage, the capacitors 357 and 358 are employed as voltage dividers. A capacitor 360 is provided to prevent direct current from being short circuited through the inductance coil 355, while permitting free passage of the alternating current component of the plate current. Resistors 361 and 362 produce the grid bias from the direct current component of the grid current. Inductance coil 363, capacitor 364 and resistor 365 form a decoupling network to isolate the 2 kc. oscillations from the power supply 351. The output signal of the oscillator 271 is produced across a resistor 366, which is connected to the primary winding 276 of the detector transformer 270 by way of a conductor 367. The construction and operation of the detector transformer 270 has been previously described in detail.

Across the secondary windings 277 and 278 of the detector transformer 270 is produced the output voltage signal of the detector transformer 270, which is representative of the weight of a package advancing across the platform 25 of the weighing device C. The output voltage signal from the electromechanical transducer 35 is fed to a suitable audio amplifier 370 by way of a conductor 371 and a resistor 372. Included in the amplifier 370 are four stages 375, 376, 377 and 378, which are connected in cascade. The amplifier stage 378 is a cathode follower, which supplies an output signal to an alternating current recorder 380 over a path including conductor 381, capacitor 382 and switch 383. In case a direct current recorder is employed, the switch 383 is actuated to close contacts 383b and to open contacts 383a for connecting a rectifier circuit 384 between the output of the cathode follower 378 and the input of the direct current recorder.

To compensate for nonlinearity in the amplifier 370, a portion of the output signal from the amplifier stage 377 is fed back to the input stage 375 of the amplifier 370 through a feedback resistor 385 by way of a conductor 386. The remaining portion of the output signal from the stage 377 of the amplifier 370 is fed to a weight classifying circuit 390, which comprises thyratron tubes 391 and 392. The thyratron tubes 391 and 392 of the classifying circuit 390 are progressively biased to cut-off. Stated otherwise, the bias on the grid of the thyratron tube 392 is more negative than the bias on the grid of the thyratron tube 391. For biasing the thyratron tube 391 to cut-off, the grid 391a thereof is connected to a negative power supply 393 over the following path: power supply 393, conductor 394, potentiometer 395, center tap 395a, conductor 396, resistor 397, resistor 398 and the grid 391a of the thyratron tube 391. To bias the thyratron tube 392 to cut-off, the grid 392a thereof is connected to the negative power supply 393 in the following manner: power supply 393, conductor 394, potentiometer 400, center tap 400a, resistor 402 and the grid 392a of the thyratron tube 392.

As previously mentioned, the output signal from the stage 377 of the amplifier 370 is fed to the weight classifying circuit 390. For impressing the output signal of the audio amplifier 370 on the grid 391a of the thyratron tube 391, the following path is established: amplifier stage 377, conductor 410, conductor 411, capacitor 412, resistor 398 and the grid 391a of the thyratron tube 391. Simultaneously, the output signal of the audio amplifier 370 is also impressed on the grid 392a of the thyratron tube 392 over the following path: amplifier stage 377, conductor 410, conductor 413, capacitor 414, resistor 402 and the grid 392a of the thyratron tube 392.

By varying the settings of the center taps 395a and 400a of the potentiometers 395 and 400, respectively, the firing of the thyratron tubes 391 and 392 is controlled to enable the classifying circuit 390 to operate in a manner to classify each package advancing across the scale platform 25 in accordance with its weight. In the exemplary embodiment of the present invention, the potentiometers 395 and 400 are adjusted so that the thyratron tubes 391 and 392 do not conduct when the signal transmitted by the audio amplifier 370 is representative of the weight of an underweight package. The potentiometers 395 and 400 are further adjusted so that only the thyratron tube 391 conducts when the output signal of the audio amplifier 370 is representative of the weight of a package meeting a desired weight requirement. This is accomplished by making the bias on the thyratron tube 391. If the signal transmitted by the audio amplifier 370 is representative of the weight of an overweight package, both thyratron tubes 392 and 391 will fire.

Connected to the plate 391b of the thyratron tube 391 is a relay 420 that is energized while the thyratron tube 391 conducts. A relay 430 is connected to the plate 392b of the thyratron tube 392 and is energized while the thyratron tube 392 conducts. The contacts of relays 420 and 430 prepare energizing circuits for the solenoid 325 (FIGS. 2 and 3). An underweight solenoid 325a, a desired weight solenoid 325b, and an overweight solenoid 325c are shown to illustrate the various connections that may be utilized for the gate-actuating solenoid 325. The solenoid 325 may be connected either as solenoid 325a, 325b or 325c so that the packages segregated by way of the chute 330 (FIG. 3) will either be underweight packages, desired weight packages or overweight packages dependent upon whether the solenoid 325 is connected to the electronic control unit D as solenoid 325a, 325b or 325c.

For operating the solenoid 325 as a package is discharged onto the conveyor E and for extinguishing the conducting thyratron tubes of the classifying circuit 390 as a package is segregated by the reject mechanism 50 a phototube relay timing circuit 440 is provided. The timing circuit 440 includes a cathode-coupled multivibrator that comprises triode tubes 441 and 442. The tube 441 of the multivibrator is normally biased to cut-off, while the tube 442 of the multivibrator is normally conducting. In the plate circuit of the triode tube 442 is a relay 450. Since the tube 442 is normally conducting, the relay 450 is normally energized.

As a package is discharged from the weighing platform 25 onto the conveyor E, the package interrupts the light beam projected by the lamp 40 toward the phototube 45.

When the light beam is interrupted, the phototube 45 emits a control signal that is impressed on the grid 441a of the triode tube 441 over the following path: grid 441a, resistor 460, resistor 461, conductor 462, phototube 45, conductor 463 and ground. The control signal is of sufficient magnitude to cause the triode tube 441 to conduct, thereby rendering the triode tube 442 non-conductive. As a consequence thereof, the relay 450 in the plate circuit of the tube 442 is deenergized and the voltage on the grid 442a of the triode tube 442 rises exponentially. When the grid-to-cathode voltage on the tube 442 reaches a sufficient magnitude, the tube 442 once again conducts and the tube 441 is rendered non-conductive. The interval of time it takes for the triode tube 442 to return to its initial state is dependent upon the time constant of resistor 470, variable resistor 471 and capacitor 472. Therefore, the variable resistor 471 is adjusted so that the time interval between the transmission of the control signal by the phototube 45 and the return of the relay 450 to its normally energized state is commensurate with the time it takes for a package to advance from a point where it interrupts the beam of light projected toward the phototube 45 to a point beyond the reject door 315 of the reject mechanism E.

Upon the deenergization of the relay 450, contacts 452 close and contacts 453 open. The closing of contacts 452 completes the energizing circuit to operate the solenoid 325 when the energizing circuit for the solenoid 325 is prepared for operation by the classifying circuit 390. The opening of contacts 453 permits a capacitor 480 in the plate circuit of the thyratron tube 391 to charge to the plate potential, when the thyratron tube 391 is conducting, over the following path: ground, thyratron tube 391, capacitor 480, resistor 482, resistor 483, conductor 484 and the power supply 351. Similarly, the opening of the contacts 453 permits a capacitor 481 in the plate circuit of the thyratron tube 392 to charge to the plate potential, when the thyratron tube 392 is conducting, over the following path: ground, thyratron tube 392, capacitor 481, resistor 485, resistor 483, conductor 484, and the power supply 351. It is to be observed that a capacitor 490 at one end is connected to the junction of the resistors 482 and 485 and at the other end, it is connected to ground. When the relay 450 is deenergized, the contacts 452 break so that the capacitor 490 is between ground and the junction of the resistors 482 and 485. However, when the relay 450 is returned to the energized state at the end of the timing cycle, the capacitor 490 is shorted by the closing of the contacts 452. This results in an instantaneous negative peak voltage appearing across a conducting thyraton, whereby the conducting thyratron is extinguished to permit its grid to regain control over the conduction thereof.

In the operation of the weight checking apparatus A of the present invention, packages are placed on the transversely spaced belts 101 and 102 of the continuously operated conveyor B with the longitudinal axis of the packages disposed transversely to the direction of travel of the belts 101 and 102. The conveyor B transfers the packages onto the conveyor 20 of the weighing device C in spaced apart relation so that only one package at a time is supported by the weighing platform 25 and so that the time interval between packages is adequate to permit the weighing device C to return to its undepressed position.

The conveyor 20 advances the spaced packages in a continuous procession over the platform 25, which descends when the weight of the package thereon exceeds the preload force transmitted by the torsion bar assembly 30. When the platform 25 descends under the weight of a package advancing thereacross, it causes displacement of the core 272 of the detector transformer 270 relative to the windings 276—278 to effect the production of a net voltage across the secondary windings 277 and 278 that is representative of the magnitude of the depression of the platform 25. The voltage signal produced across the output of the detector transformer 270 is fed to the audio amplifier 370, which transmits the amplified signal to the classifying circuit 390 for impressing the voltage signal simultaneously on the grids of the thyratron tubes 391 and 392.

Assuming for the purpose of the present discussion that the solenoid 325 of the reject mechanism E is connected to the electronic control unit D as underweight solenoid 325a. If the package advancing across the weighing platform 25 is an underweight package, the signal transmitted by the amplifier 370 is insufficient to fire either the thyratron tube 391 or the thyratron tube 392. Hence, the thyratron tubes 391 and 392 do not conduct and the relays 420 and 430 in their respective plate circuits will not be energized.

As the underweight package is discharged from the weighing device C onto the rollers 308 of the reject mechanism E, the package interrupts the beam of light projected by the lamp 40 toward the phototube 45. As a consequence thereof, the tube 441 of the timing circuit 440 conducts and renders the normally conducting tube 442 non-conductive. Thereupon, the normally energized relay 450 is deenergized. Upon the deenergization of the relay 450, contacts 452 close and contacts 453 break. The closing of contacts 452 completes an energizing circuit for the solenoid 325a over the following path: ground, solenoid 325a, contacts 421, contacts 431, contacts 452 and the power supply 351. The energization of the solenoid 325a causes the reject door 315 to pivot about the axis of the shaft 316 to permit the underweight package advancing on the rollers 308 to be discharged into the chute 330. After the underweight package falls into the chute 330, the tube 442 returns to its normal state and conducts. The tube 441 is rendered non-conductive and the relay 450 is again energized. The energization of the relay 450 opens the contacts 452 to deenergize the solenoid 325a.

In case the package advancing across the weighing platform 25 is of a desired weight, the signal transmitted by the amplifier 370 is sufficient to fire the thyratron tube 391, but is insufficient to fire the thyratron tube 392. The conduction of the thyratron tube 391 causes the relay 420 to be energized. Upon the energization of the relay 420, contacts 421 break to prevent the energization of the solenoid 325a over the previously mentioned path. Thus, the solenoid 325a does not operate. Consequently, the desired weight package advances on the rollers 308 over the reject door 315 and onto the rollers 309 for discharge onto a loading platform, not shown.

As the desired weight package is discharged from the weighing device C onto the rollers 308 of the reject mechanism E, the package interrupts the beam of light projected toward the phototube 45. Consequently, the tube 441 conducts and renders the normally conducting tube 442 non-conductive. Thereupon, the relay 450 is deenergized to open contacts 453. The opening of contacts 453 enables the capacitor 480 to charge to the plate potential through the conduction of the thyratron tube 391. After sufficient time has elapsed to permit the desired weight package to advance beyond the reject door 315, the tube 442 returns to its normal state and conducts. As a result, the tube 441 is rendered non-conductive and the relay 450 is again energized. Upon the relay 450 being energized, contacts 453 close for the instantaneous discharge of the capacitor 480, which results in extinguishing the thyratron tube 391. The relay 420 is again deenergized.

If the package advancing across the weighing platform 25 is an overweight package, the signal transmitted by the amplifier 370 causes the thyratron tubes 391 and 392 to conduct. This results in the energization of the relays 420 and 430. Upon the energization of the relays 420 and 430, contacts 421 and 431 open to prevent the operation of the solenoid 325a. As a result, the overweight package advances on the rollers 308 over the reject door 315 and onto the rollers 309 for discharge onto a loading platform, not shown.

As the overweight package is discharged from the weighing device C onto the rollers 308 of the reject mechanism E, the package interrupts the beam of light projected toward the phototube 45. Consequently, the tube 441 conducts and renders the tube 442 non-conductive. Thereupon, the relay 450 is deenergized to open contacts 453. The opening of the contacts 453 enables the capacitors 480 and 481 to charge to the plate potential through the conduction of the thyratron tubes 391 and 392, respectively. After sufficient time has elapsed to permit the overweight package to advance beyond the reject door 315, the tube 442 returns to its normal state and conducts. As a result thereof, the tube 441 is rendered non-conductive and the relay 450 is again energized. Upon the relay 450 being energized, the contacts 453 close for the instantaneous discharge of the capacitors 480 and 481, which results in the extinguishing of the thyratron tubes 391 and 392. The relays 420 and 430 are then deenergized.

When the solenoid 325 is connected to the electronic control unit D as solenoid 325b, the packages of the desired weight will be discharged into the chute 330 and the packages that are underweight or overweight will advance onto the rollers 309 for discharge to a loading platform, not shown. As previously described, if the package of the desired weight advances across the weighing platform 25, the signal transmitted by the amplifier 370 is of sufficient magnitude to fire the thyratron tube 391, but is insufficient in magnitude to overcome the bias on the thyratron tube 392. Thus, the thyratron tube 391 conducts, but the thyratron tube 392 remains non-conductive. Therefore, the relay 420 is operated to close contacts 424 and the relay 430 remains deenergized. As the package of desired weight is discharged from the weighing platform 25, it interrupts the beam of light projected toward the phototube 45. Consequently, the tube 441 conducts and the tube 442 is rendered non-conductive. This results in the relay 450 being deenergized and the contacts 452 closing to complete an energizing circuit for the solenoid 325b over the following path: ground, relay 325b, contacts 424, contacts 431, contacts 452 and the power supply 351. The energization of the solenoid 325b causes the reject door 315 to pivot about the axis of the shaft 316 to permit the package of desired weight advancing on the rollers 308 to be discharged into the chute 330.

After the desired weight package falls into the chute 330, the tube 442 returns to its normal state and conducts. The tube 441 is rendered non-conductive and the relay 450 is again energized. Upon the energization of relay 450, contacts 452 break to release the solenoid 325b and the contacts 453 close for the instantaneous discharge of the capacitor 480. The discharge of the capacitor 480 results in the extinguishment of the thyratron tube 391, thereby deenergizing the relay 420.

In case an underweight package advances across the weighing platform 25, the signal transmitted by the amplifier 370 is of insufficient magnitude to fire either the thyratron tube 391 or the thyratron tube 392. Consequently, the relay 420 remains deenergized and the contacts 424 are open. Since the contacts 424 are open, the solenoid 325b remains deenergized. Therefore, the underweight package advances on the rollers 308 over the reject door 315 and onto the rollers 309 for discharge onto a loading platform, not shown.

When an overweight package advances across the weighing platform 25, the signal transmitted by the amplifier 370 is of sufficient magnitude to fire both the thyratron tube 391 and the thyratron tube 392. This results in the relays 420 and 430 being energized. The energization of the relay 430 causes contacts 431 to open, thereby preventing the energization of the solenoid 325b. Consequently, the overweight package advances on the rollers 308 over the reject door 315 and onto the rollers 309 for discharge onto a loading platform, not shown. The thyratron tubes 391 and 392 extinguish in a manner above described, which results in the deenergization of the relays 420 and 430.

When the solenoid 325 is connected to the electronic control unit D as solenoid 325c, the overweight packages will be discharged into the chute 330. The desired weight and underweight packages will advance onto the rollers 309 for discharge to a loading platform, not shown. As an overweight package advances across the weighing platform 25, the amplifier 370 transmits a signal to the classifying circuit 390 that is of sufficient magnitude to fire both the thyratron tube 391 and the thyratron tube 392. The conduction of the thyratron tubes 391 and 392 causes the relays 420 and 430 to be energized. Upon energizing relay 430, contacts 434 close to prepare an operating circuit for the solenoid 325c.

As the overweight package is discharged from the platform 25 onto the rollers 308, the light beam projected toward the phototube 45 is interrupted. The phototube 45 emits a signal to cause the triode tube 441 to conduct, thereby rendering the triode tube 442 non-conductive. When the triode tube 442 is non-conductive, the relay 450 is deenergized. Consequently, contacts 453 close to complete an operating circuit for the solenoid 325c over the following path: ground, solenoid 325c, contacts 434, contacts 452, and power supply 351. The energization of the solenoid 325c results in the pivoting of the door 315 so that the overweight package is advanced from the rollers 308 into the chute 330.

The deenergization of the relay 450 opened contacts 453, thereby permitting the capacitors 480 and 481 to charge to plate potential through their associated conducting thyratron tubes 391 and 392. After sufficient time has elapsed for the overweight package to be discharged into the chute 330, the triode tube 442 returns to its normally conducting state, thereby rendering the tube 441 non-conductive. This also results in the relay 450 being again energized. Upon the energization of the relay 450, contacts 451 break to release the solenoid 325c and the door 315 is returned to its normal position. Contacts 453 close to cause the capacitors 480 and 481 to be instantaneously discharged, which results in the extinguishment of the thyratron tubes 391 and 392. As a consequence thereof, the relays 420 and 430 are again deenergized.

In case an underweight package advances across the weighing platform 25, the signal transmitted by the amplifier 370 is insufficient in magnitude to fire either the thyratron tube 391 or the thyratron tube 392. Therefore, the relay 430 remains deenergized and contacts 434 are open. Since contacts 434 are open, the solenoid 325c remains deenergized. Hence, an underweight package advances over the rollers 308, across the door 315 and onto the rollers 309 for discharge onto a loading platform, not shown.

If the package advancing across the weighing platform 25 is of a desired weight, the amplifier 370 causes the thyratron tube 391 to conduct, but is insufficient in magnitude to cause the thyratron tube 392 to conduct. Thus, the relay 430 remains deenergized and contacts 434 are open. With contacts 434 open, the solenoid 325c remains deenergized. Therefore, a package of desired weight advances over the rollers 308, across the door 315 and onto the rollers 309 for discharge onto a loading platform, not shown. The thyratron tube 391 is extinguished and the relay 420 is deenergized in a manner previously described.

From the foregoing description it will be seen that the present invention provides a particularly effective weight checking apparatus. The torsion bar provides a means of preloading the scale platform that is more effective than any previously known. The scale which supports the articles on two relatively narrow bars, and the two narrow belts which cooperate with the bars to position the article for weighing makes possible an extremely accurate weighing operation. Further, the use of separate subframes for each operating unit results in a weight checking apparatus that is easy to assemble and service.

It will be understood that modifications and variations of the invention disclosed herein may be resorted to without departing from the spirit of the invention and the scope of the appended claims.

Having thus described our invention, what we claim as new and desire to protect by Letters Patent is:

1. Apparatus for weighing moving articles comprising a frame, a scale assembly comprising two spaced, relatively narrow parallel support bars defining a load receiving platform, spring means yieldably supporting said bars, and first and second rollers mounted on said frame adjacent the entrance and exit ends of said support bars respectively, a third roller longitudinally spaced from said first roller, a pair of relatively narrow belts trained over said first and second rollers and having upper reaches riding over said support bars for carrying articles over said scale assembly, article delivery belt means trained over said third and first rollers, said delivery belt means and said scale belts being disposed in interfitting relation at said first roller, and means for driving said first roller and hence both said scale belts and said article delivery belt means, so that the upper reaches of said scale belts are substantially relieved of driving tension except that directly imposed by the articles and said article delivery belt means develops the tension necessary to supply articles to said scale belts.

2. In a weighing apparatus, a plurality of endless narrow belts having horizontal runs for advancing articles along a predetermined path, said runs being spaced apart in a direction transversely to said predetermined path, means for engaging said belts to adjust the transverse distance therebetween for accommodating different size articles, a scale platform comprising a plurality of narrow horizontal runners disposed under the horizontal runs of said belts for supporting articles advanced by said runs, means mounting said runners for movement in a direction transversely to said predetermined path and into transverse alignment with said belts, and means yieldably supporting said platform, whereby said platform is movable downwardly by the weight of an article passing thereacross while resting on said belts.

3. An adjustable lightweight scale platform and conveyor assembly for weighing moving articles comprising two spaced, narrow parallel bars for supporting articles to be weighed, a plurality of transverse rods interconnecting said bars, means operatively connected to said bars and to said rods to yieldably support said platform, said bars being laterally adjustable on said rods, a transverse roller at each end of said bars, said rollers having a smooth peripheral surface, a pair of narrow flat belts trained over said rollers and passing along said bars, means for laterally shifting said belt along the smooth surface of said rollers and into lateral alignment wtih said bars and means to drive one of said rollers.

4. Apparatus for weighing moving articles comprising a frame, a scale assembly comprising two spaced, narrow parallel support bars defining a load receiving plaform, weight responsive means yieldably supporting said bars on said frame, means mounting said bars for lateral adjustment on said weight responsive means, first and second rollers mounted on said frame adjacent the entrance and exit ends of said support bars, respectively, a third roller longitudinally spaced from said first roller, all of said rollers having smooth peripheral surfaces, a pair of relatively narrow scale belts trained over said first and second rollers and having upper reaches riding over said support bars for carrying articles over said scale assembly, means for laterally shifting said scale belts along the smooth surfaces of said first and second rollers, a pair of article delivery belts trained over said third and first rollers, means for laterally shifting said delivery belts along the smooth surfaces of said first and third rollers, and means for driving said first roller and hence both said scale belts and said article delivery belts.

5. Apparatus for weighing moving articles comprising a frame, a scale assembly comprising two spaced, narrow parallel support bars defining a load receiving platform, weight responsive means yieldably supporting said bars on said frame, means mounting said bars for lateral adjustment on said frame, means mounting said bars for lateral adjustment on said weight responsive means, and first and second scale rollers mounted on said frame adjacent the entrance and exit ends of said support bars, respectively, a third roller longitudinally spaced from said first scale roller, all of said rollers having smooth peripheral surfaces, a pair of relatively narrow scale belts trained over said first and second rollers and having upper reaches riding over said support bars for carrying articles over said scale assembly, a flanged pulley for guiding the lower reach of each scale belt, means for laterally shifting said flanged pulleys to move said scale belts along the smooth surfaces of said first and second rollers, a pair of article delivery belts having upper reaches trained over said third and first rollers, a flanged pulley for guiding the lower reach of each delivery belt, means for laterally shifting said latter flanged pulleys to move said delivery belts along the smooth surfaces of said first and third rollers, and means for driving one of said scale rollers.

References Cited in the file of this patent

UNITED STATES PATENTS

| Number | Name | Date |
|---|---|---|
| 167,519 | Fowler | Sept. 7, 1875 |
| 1,868,538 | McKee | July 26, 1932 |
| 1,999,827 | Wardley | Apr. 30, 1935 |
| 2,016,789 | Newhaus | Oct. 18, 1935 |
| 2,568,255 | Schieser | Sept. 18, 1951 |
| 2,633,972 | Capstack | Apr. 7, 1953 |
| 2,649,294 | Walter | Aug. 18, 1953 |
| 2,725,974 | Shields | Dec. 6, 1955 |
| 2,784,958 | Brykett | Mar. 12, 1957 |
| 2,785,787 | Leavens | Mar. 19, 1957 |
| 2,905,310 | Stoeckel | Sept. 22, 1959 |
| 2,938,626 | Dahms | May 31, 1960 |
| 2,954,969 | McCullough | Oct. 4, 1960 |
| 3,017,026 | Thompson | Jan. 16, 1962 |